(12) United States Patent
Yamamoto

(10) Patent No.: US 9,893,651 B2
(45) Date of Patent: Feb. 13, 2018

(54) LINEAR VIBRATION-WAVE MOTOR

(71) Applicant: CANON KABUSHIKI KAISHA, Tokyo (JP)

(72) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 14/595,497

(22) Filed: Jan. 13, 2015

(65) Prior Publication Data

US 2015/0200611 A1    Jul. 16, 2015

(30) Foreign Application Priority Data

Jan. 16, 2014    (JP) .................................. 2014-005733

(51) Int. Cl.
*H02N 2/02*    (2006.01)
*G02B 7/10*    (2006.01)
*H02N 2/00*    (2006.01)

(52) U.S. Cl.
CPC ............... *H02N 2/026* (2013.01); *G02B 7/10* (2013.01); *H02N 2/0055* (2013.01)

(58) Field of Classification Search
CPC ................................ H02N 2/026; H02N 2/04
USPC ........................ 310/323.01–323.21
See application file for complete search history.

(56) References Cited

U.S. PATENT DOCUMENTS

| | | | | |
|---|---|---|---|---|
| 5,136,200 A | * | 8/1992 | Takizawa ............... | H02N 2/003 310/323.16 |
| 2005/0275314 A1 | | 12/2005 | Sasaki et al. | |
| 2005/0275315 A1 | | 12/2005 | Manabe et al. | |

FOREIGN PATENT DOCUMENTS

| | | |
|---|---|---|
| CN | 1581666 A | 2/2005 |
| CN | 1851517 A | 10/2006 |
| CN | 101425762 A | 5/2009 |
| CN | 102445875 A | 5/2012 |
| CN | 102545689 A | 7/2012 |
| JP | 04-322177 A | 11/1992 |
| JP | 2006-187114 A | 7/2006 |
| JP | 05117058 B2 | 1/2013 |

(Continued)

OTHER PUBLICATIONS

The above patent documents were cited in the Jan. 13, 2017 Korean Office Action, without an English Translation, that issued in Korean Patent Application No. 10-2015-0007733.

(Continued)

*Primary Examiner* — Derek Rosenau
(74) *Attorney, Agent, or Firm* — Cowan, Liebowitz & Latman, P.C.

(57) ABSTRACT

A linear vibration-wave motor being configured to apply a driving force to a lens barrel of an optical device includes a vibrator being operable to excite a vibration, a member to be contacted contacting the vibrator, the vibrator being arranged to move in a direction of the driving force with respect to the member to be contacted upon exciting the vibration, a vibrator support being fixed to the lens barrel and configured to support the vibrator, a pressurization member being operable to press the vibrator against the member to be contacted, a unit cover member including an opening extending in the direction of the driving force, and a unit base member having fixed thereto the member to be contacted and the unit cover member. The pressurization member is detachable from the vibrator support via the opening.

8 Claims, 4 Drawing Sheets

(56) References Cited

FOREIGN PATENT DOCUMENTS

WO 2014/196212 A1 12/2014

OTHER PUBLICATIONS

The above foreign patent documents were cited in a Chinese Office Action issued on Aug. 3, 2016, with an English Translation, that issued in Chinese Patent Application No. 201510023417.4.
The above patent documents were cited in a European Search Report dated Jul. 13, 2015, that issued in the corresponding European Patent Application No. 15151435.3.

* cited by examiner

LINEAR VIBRATION-WAVE MOTOR

BACKGROUND OF THE INVENTION

Field of the Invention

The present invention relates to a vibration-wave motor and, more particularly, to a linear vibration-wave motor unit including a linear ultrasonic motor or the like that can be incorporated in an optical device.

Description of the Related Art

There has conventionally been known a technique of driving a sliding member by pressurizing a vibrator configured to vibrate periodically upon application of a high-frequency voltage, and bringing the vibrator into contact with the sliding member in a linear vibration-wave motor of this type.

SUMMARY OF THE INVENTION

However, in a conventional technique disclosed in Japanese Patent Application Laid-Open No. 2006-187114, a component is directly incorporated in the lens barrel of an optical device. For this reason, only characteristics in an actual load state can be guaranteed, and the no-load characteristics of a linear vibration-wave motor unit and the like cannot be confirmed. A problem in quality is highly likely to occur.

The present invention provides a stable-quality linear vibration-wave motor whose performance as a single item is guaranteed.

According to an aspect of the present invention, there is provided a linear vibration-wave motor that applies a driving force to a lens barrel, of an optical device, comprising a vibrator being operable to excite a vibration, a member to be contacted contacting the vibrator, the vibrator being arranged to move in a direction of the driving force with respect to the member to be contacted upon exciting the vibration, a vibrator support being fixed to the lens barrel and configured to support the vibrator, a pressurization member being operable to press the vibrator against the member to be contacted, a unit cover member having an opening extending in the direction of the driving force, and a unit base member having fixed thereto the member to be contacted and the unit cover member, in which the pressurization member is detachable from the vibrator support via the opening.

The present invention can implement a stable-quality linear vibration-wave motor whose performance as a single item can be better guaranteed.

Further features of the present invention will become apparent from the following description of embodiments with reference to the attached drawings.

DESCRIPTION OF THE EMBODIMENTS

Preferred embodiments of the present invention will now be described in detail in accordance with the accompanying drawings.

Figure 1A:
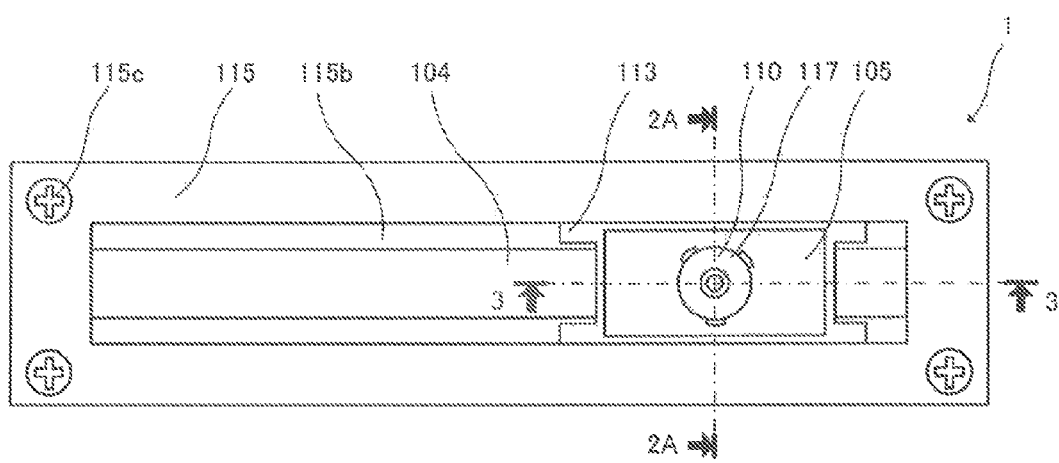
FIG. 1A s a plan view showing a linear ultrasonic motor according to the present invention.
Figure 1B:
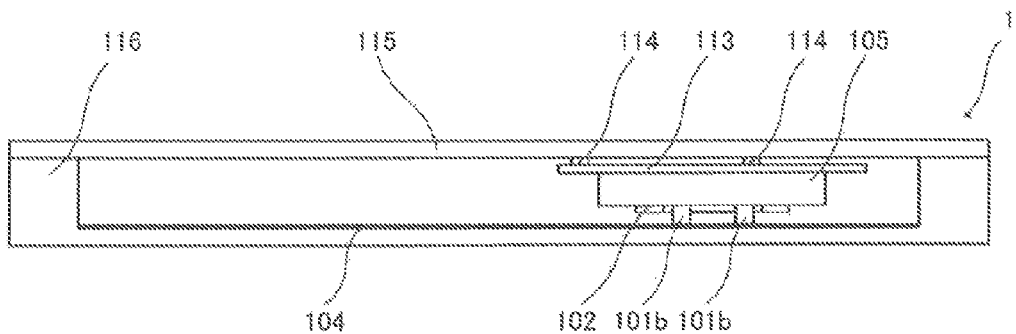
FIG. 1B is a front view showing the linear ultrasonic motor according to the present invention.

FIGS. 1A and 1B show the outer appearance of a linear ultrasonic motor 1 as an embodiment of a linear vibration-wave motor according to the present invention that functions as a focus driving source for an optical device such as the lens barrel for a lens and applies a driving force. FIG. 1A is a plan view, and FIG. 1B is a front view.

Figure 2A:
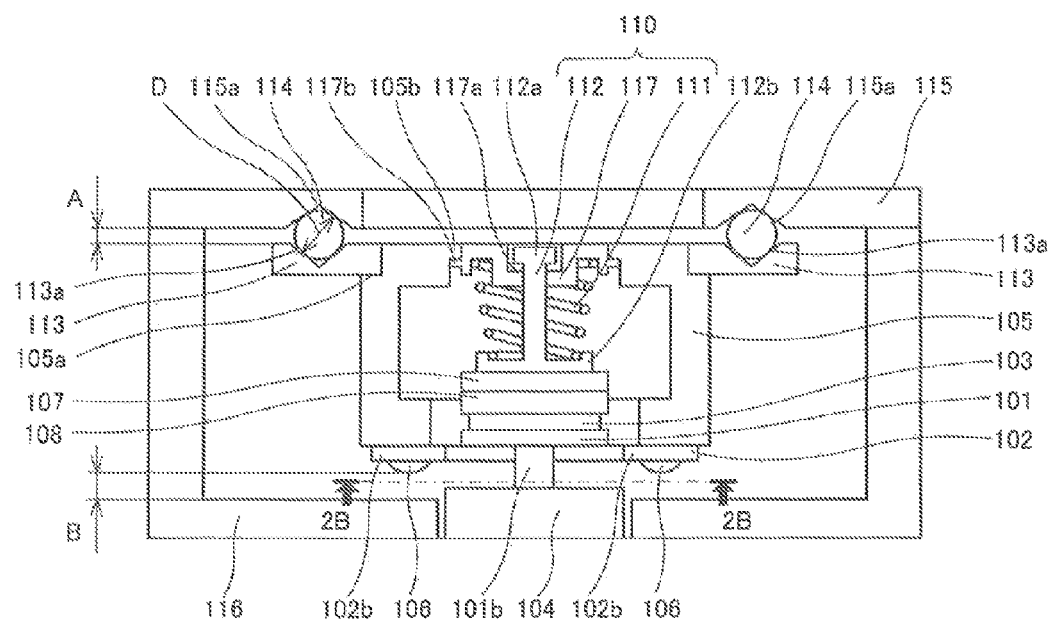
FIG. 2A is a sectional view taken along a line 2A-2A in FIG. 1A.
Figure 2B:
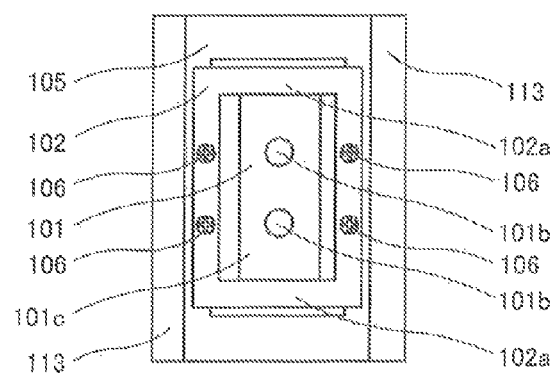
FIG. 2B is a sectional view taken along a line 2B-2B in FIG. 2A.

FIGS. 2A and 2B are sectional views showing the main parts of the linear ultrasonic motor 1. FIG. 2A shows a section perpendicular to the direction of the driving force to the lens barrel as a sectional view taken along a line 2A-2A in FIG. 1A. FIG. 2B shows a sectional view taken along a line 2B-2B in FIG. 2A. Members other than a vibrator, a connecting member, a vibrator support member, and a moving plate are not illustrated.

Figure 3:
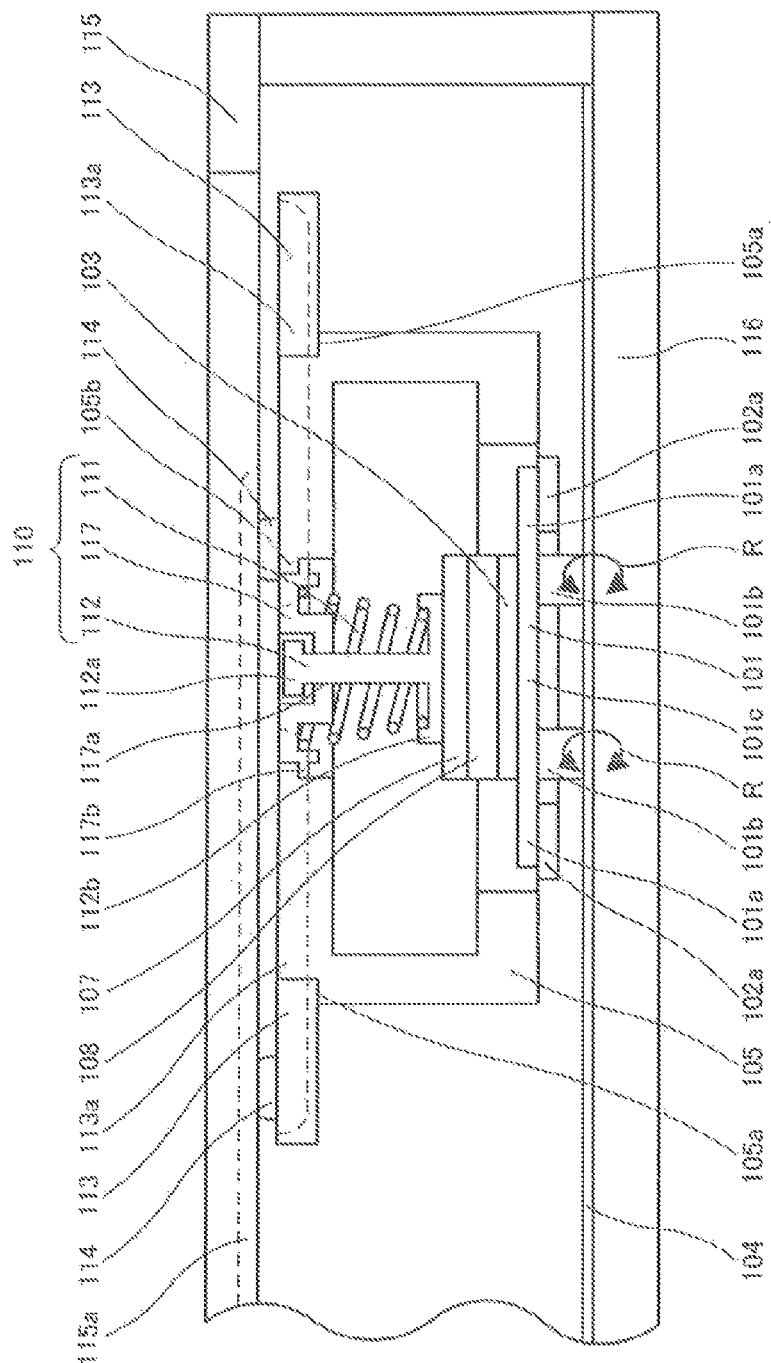
FIG. 3 is a sectional view taken along a line 3-3 in FIG. 1A.

FIG. 3 is a sectional view showing the main part of the linear ultrasonic motor 1. FIG. 3 shows a section with respect to the direction of the driving, force to the lens barrel as a sectional view taken along a line 3-3 in FIG. 1A.

The linear ultrasonic motor 1 comprises a vibrator 101, parts 101a to be joined, a connecting member 102, a piezoelectric element 103, a member 104 to be contacted, a vibrator support member 105, screws 106, a pressurization plate 107 and an elastic member 108.

The vibrator 101 includes parts 101a to be joined, pressurized contact parts 101b and a vibration plate 101c. The parts 101a to be joined are fixed to joining parts 102a of the connecting member 102 having a rectangular frame shape by welding or the like (see FIG. 2B). Note that the shape of the connecting member 102 is not specifically limited as long as the vibrator 101 fixed. The piezoelectric element 103 is fixed to the vibrator 101 by a well-known adhesive or the like. The piezoelectric element 103 is set so that when a high-frequency voltage as a high-frequency driving voltage is applied, ultrasonic vibrations are excited, and the vibration plate 101c of the vibrator 101 resonates in a longitudinal direction coincident with the direction of the driving force to the lens barrel and a lateral direction coincident with a direction perpendicular to the direction of the driving force. As a result, the tips of the pressurized contact parts 101b formed on the vibrator 101 cause an ellipsoidal motion R, as shown in FIG. 3. By changing the frequency or phase of the high-frequency voltage applied to the piezoelectric element 103, the rotational direction and ellipse ratio of the ellipsoidal motion R are appropriately changed to generate a desired ellipsoidal motion R. Accordingly, a driving force to the lens barrel is generated by a frictional force with the member 104 to be contacted that is the mating component of the vibrator 101. That is, the member 104 to be contacted extends in the direction of the driving force to the lens barrel, and the vibrator 101 itself may move forward and backward in the direction of the driving force to the lens barrel along the optical axis of the lens barrel (direction perpendicular to the paper surface of FIG. 2A, and the left-and-right direction on the paper surface of FIG. 3).

In the drawings, screwing parts 102b of the connecting member 102 to which the vibrator 101 is fixed are fixed by the screws 106 to attaching positions of the vibrator support member 105. In the present invention, the vibrator support member 105, the connecting member 102 and the screws 106 constitute a vibrator support. The pressurization plate 107 is configured to pressurize and hold the piezoelectric element 103 via the elastic member 108, which will be described later.

The linear ultrasonic motor 1 further comprises a pressurization spring 111, a spring support member 112 and a spring base member 117.

The pressurization spring 111 is interposed between the spring support member 112 and the spring base member 117. The pressurization spring 111 constitutes a pressurization spring unit 110 serving as a pressurization member together with the spring support member 112 and the spring base member 117 serving as a pressurization member attaching part. A tip large-diameter part 112a of the spring support member 112 is received in a fitting part 117a of the spring base member 117 at a low pressure. After the assembly, the unit state may be maintained against the spring force of the pressurization spring 111. Bayonet projections 117b are formed at a plurality of portions in the circumferential direction on the outer-diameter part of the spring base member 117. In the incorporation state, bayonet engaging parts 105b formed on the vibrator support member 105 define positions of the bayonet projections 117b in the pressurization direction. Therefore, a tip pressing part 112b of the spring support member 112 generates pressing force that presses the vibrator 101 against the member 104 to be contacted via the pressurization plate 107 and the elastic member 108 by the pressurization force of the pressurization spring 111. In other words, an impression or impulse force is applied by the pressing part 112b to the member 104 to be contacted via the pressurization plate 107 and the elastic member 108 of the pressurization force of the pressurization spring 111.

The linear ultrasonic motor 1 further comprises a moving plate 113, rollable balls 114 (i.e. ball bearings), a unit cover member 115 and a unit support member 116.

The moving plate 113 is fixed to an abutment part 105a of the vibrator support member 105 by a well-known method such as bonding or screwing, and constitutes part of a guide member. The moving plates 113 have a plurality of V-shaped grooves 113a (first grooves serving as first guides) in which the rollable balls 114 serving as rollable members are received to guide the vibrator support member 105 in the optical axis direction (see FIG. 4). The unit cover member 115 is fixed to the unit support member 116 serving as a unit base member by well-known screws 115c or the like. The unit cover member 115 also constitutes part of the above-mentioned guide. By receiving the rollable balls 114 in V-shaped grooves 115a (second grooves serving as second guides) formed at positions where they face the V-shaped grooves 113a of the moving plates 113, the vibrator support member 105 may be supported to be movable forward and backward in the direction of the driving force to the lens barrel. Note that the V-groove is a groove having a V-shaped section and is, for example, a groove having inclined surfaces that decrease the groove width as the depth from the surface increases.

In the above-described arrangement, the pressurization spring unit 110 has a well-known bayonet structure. Therefore, even after completion of assembling the linear ultrasonic motor 1, it is possible to detach and attach the pressurization spring unit 110 from the linear ultrasonic motor 1. An opening 115b is formed in the unit cover member 115 so that the vibrator support member 105 is detachable within the movable range through the opening 115b formed to extend in the direction of the driving force to the lens barrel. That is, the width of the opening 115b in a direction that is parallel to the opening 115b and perpendicular to the direction of the driving force to the lens barrel is larger than the maximum length of the spring base member 117 of the pressurization spring unit 110. The pressurization spring may be replaced in the entire movable region to adjust the pressurization force without replacement of other components. Even if the performance of the linear ultrasonic motor varies in any moving region, an appropriate pressurization force may be set in this region.

In the plan view of the linear ultrasonic motor according to the present invention in FIG. 1A, the same reference numerals denote the same parts as the above-described components. As described above, she unit cover member 115 has the opening 115b capable of incorporating the pressurization spring unit 110 in the movable range of the vibrator support member 105.

In the incorporation state, the vibrator support member 105 and the integrally constituted moving plates 113 have the following gaps between the unit support member 116 and the unit cover member 115, as shown in FIG. 2A. First, a gap A is generated between the moving plate 113 and the unit cover member 115 at an upper portion in FIG. 2A. At a lower portion, a gap B is generated between the screw 106 of the vibrator support and the unit support member 116 in FIG. 2A. The gap A may be a maximum gap between the moving plate 113 and the unit cover member 115 in the direction of pressing by the pressurization spring unit 110. The gap B may be a maximum gap between the vibrator support, and the unit support member 116 or the member 104 to be contacted in the direction of pressing by the pressurization spring unit 110 in this embodiment, the relation between the gap A, the gap B and a diameter D of the rollable ball 114 is set to satisfy:

$$\text{diameter } D > (\text{gap } A + \text{gap } B)$$

In a state in which the pressurization spring unit 110 is detached, the vibrator support member 105 may move down in FIG. 2A by the gap B. In this state, the width of a gap generated between the moving plate 113 and the unit cover member 115 equals the value of (gap A+gap B). As described above, the relation between the width of (gap A+gap B) and the diameter D of the rollable ball is set to satisfy "diameter D>(gap A+gap B)". Hence, even in a state in which the pressurization spring unit 110 is detached, the rollable balls 114 may maintain a structure necessary as the motor unit without dropping from the V-shaped grooves 113a and 115a. As a result, the necessary structure of the motor unit may be maintained regardless of the attaching/detaching state of the pressurization spring unit. This prevents a problem that the rollable balls drop from the unit during assembly work, and the unit cover member needs to be removed again to rearrange the rollable balls. Even if the pressurization spring needs to be replaced, as described above, the structure of the linear ultrasonic motor may be maintained, which abruptly improves the assembly work.

Figure 4:
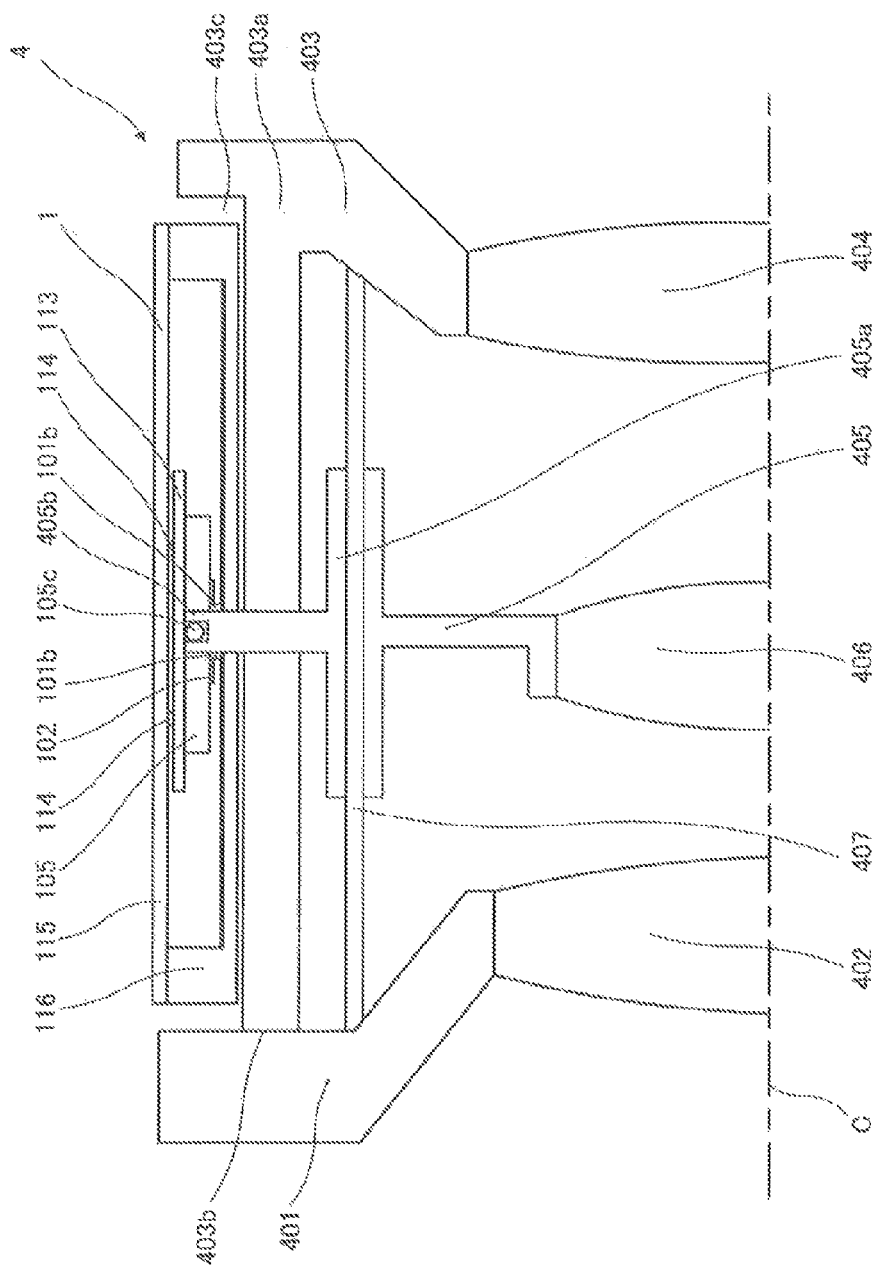
FIG. 4 is a sectional view showing the main part of a lens barrel in which the linear ultrasonic motor according to the present invention is incorporated.

FIG. 4 is a sectional view of the main part and also a side view showing a state in which the linear ultrasonic motor unit is incorporated in a lens barrel 4 for the lens of an optical device. Even in FIG. 4, the same reference numerals denote the same parts as those in the above-described embodiment.

The lens barrel 4 comprises the linear ultrasonic motor 1, a first lens support member 401, a first lens 402, a third lens support member 403, a third lens 404, a second lens support member 405, a second lens 406 and a guide has 407.

The first lens support member 401 supports the first lens 402. The third lens support member 403 supports the third lens 404. The outer part of the third lens support member 403 corresponds to a cylindrical part. 403*a*, and is fastened to the first lens support member 401 at a tip 403*b* by a screw (not shown) or the like. The unit receiving part 403*c* to which the above-described linear ultrasonic motor unit is fixed is formed at part of the outer-periphery of the cylindrical part 403*a*, and detachably fixed by a well-known screw or the like. The second lens support member 405 that holds the second lens 406 is arranged at the inner-periphery of the cylindrical part 403*a*. The second lens serving as a focus lens is moved forward and backward along an optical axis C (see FIG. 4) by the linear ultrasonic motor 1 according to the present invention. At this time, since the second lens support member 405 is received so that the well-known guide bar 407 and bearing 405*a* are relatively slidable, the second lens may be moved forward and backward along the optical axis. The second lens support member 405 and the vibrator support member 105 may be coupled by engagement between an engaging pin 105*c* of the vibrator support member 105 and an engaged part 405*b* of the vibrator support member 105, or by a well-known rack and engaging pin.

As described above, in the linear ultrasonic motor according to the present invention, the linear ultrasonic motor 1 is formed into a unit in the state as shown in FIGS. 1A to 3, and the unit is attached to the lens barrel 4 of the optical device in FIG. 4. Prior to attachment of the linear ultrasonic motor 1 to the lens barrel 4, the characteristics of the single unit of the linear ultrasonic motor 1 may be evaluated.

This form enables much more stable adjustment, compared to a technique as disclosed in the related art literature in which the characteristics of a linear ultrasonic motor are evaluated in a state in which an optical element such as a lens is incorporated and a load is applied, and the performance is adjusted based on the result.

In this arrangement, the pressurization spring unit 110 serving as a pressurization member is detachable in the entire movable range of the vibrator 101 of the linear ultrasonic motor. It is therefore possible to change the pressurization force in each region, evaluate the characteristics of the linear ultrasonic motor, and adjust an optimal pressurization force based on these results. Therefore, a linear ultrasonic motor with stable characteristics is implemented.

In this manner, the linear ultrasonic motor serving as the vibration-wave motor according to the present invention is incorporated as a unit in the lens barrel of an optical device in a state in which the performance of the single item is guaranteed. The quality of the lens barrel of the optical device is also stabilized.

The specific example of the linear ultrasonic motor unit serving as the vibration-wave motor according to the present invention, and the specific example of the lens barrel of the optical device in which the linear ultrasonic motor unit is incorporated have been described in detail. However, the present invention is not limited to the above-described embodiments, and can take any form without departing from the scope of the claims.

The present invention is widely applicable to an optical device such as a digital camera or a digital video camera.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No 2014-005733, filed on Jan. 16, 2014 which is hereby incorporated by reference herein in its entirety.

What is claimed is:

1. A linear vibration-wave motor being configured to apply a driving force, comprising:
   a vibrator being operable to excite a vibration,
   a member to be contacted contacting the vibrator, the vibrator being arranged to move in a direction of the driving force with respect to the member to be contacted upon exciting the vibration;
   a vibrator support configured to support the vibrator;
   a pressurization member being operable to press the vibrator against the member to be contacted;
   a unit cover member having an opening so that width direction thereof is extending in the direction of the driving force; and
   a unit base member having fixed thereto the member to be contacted and the unit cover member,
   wherein the pressurization member is detachable from the vibrator support via the opening.

2. A motor according to claim 1, wherein:
   the vibrator support comprises a moving plate including a first guide extending in the direction of the driving force;
   the unit cover member comprises a second guide at a position where the second guide faces the first guide; and the motor further comprises a ball bearing held between the first guide and the second guide,
   the ball bearing having a diameter larger than a sum of a maximum gap between the moving plate and the unit cover member in a direction of pressing by the pressurization member, and a maximum gap between the vibrator support and one of the unit base member and the member to be contacted in the direction of pressing by the pressurization member.

3. A motor according to claim 2, wherein:
   the first guide and the second guide are V-shaped grooves.

4. A motor according to claim 1, wherein:
   the linear vibration-wave motor is an ultrasonic motor and the vibrator is operable to excite an ultrasonic vibration.

5. A motor according to claim 1, wherein:
   the unit cover member comprises a guide for guiding movement of the vibrator in the direction of the driving force.

6. A motor according to claim 1, wherein:
   guides are formed along the opening in the direction of the driving force.

7. A motor according to claim 6, wherein:
   a plurality of the guides is formed so as to hold the opening therebetween.

8. An optical device comprising:
   a driving member;
   a linear vibration-wave motor being configured to apply a driving force so as to drive the driving member,
   wherein the linear vibration-wave motor comprises:
   a vibrator being operable to excite a vibration;
   a member to be contacted with the vibrator, the vibrator being arranged to move in a direction of the driving force with respect to the member to be contacted upon exciting the vibration;
   a vibrator support configured to support the vibrator;
   a pressurization member being operable to press the vibrator against the member to be contacted;

a unit cover member having an opening so that width direction thereof is extending in the direction of the driving force; and a unit base member having fixed thereto the member to be contacted and the unit over member, wherein the pressurization member is detachable from the vibrator support via the opening.

* * * * *